N. L. OLSON.
RESILIENT WHEEL.
APPLICATION FILED MAR. 24, 1919.
1,382,537.
Patented June 21, 1921.
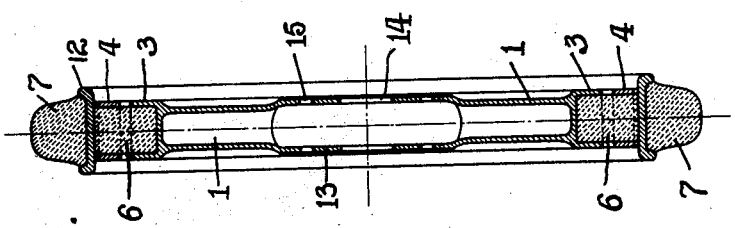
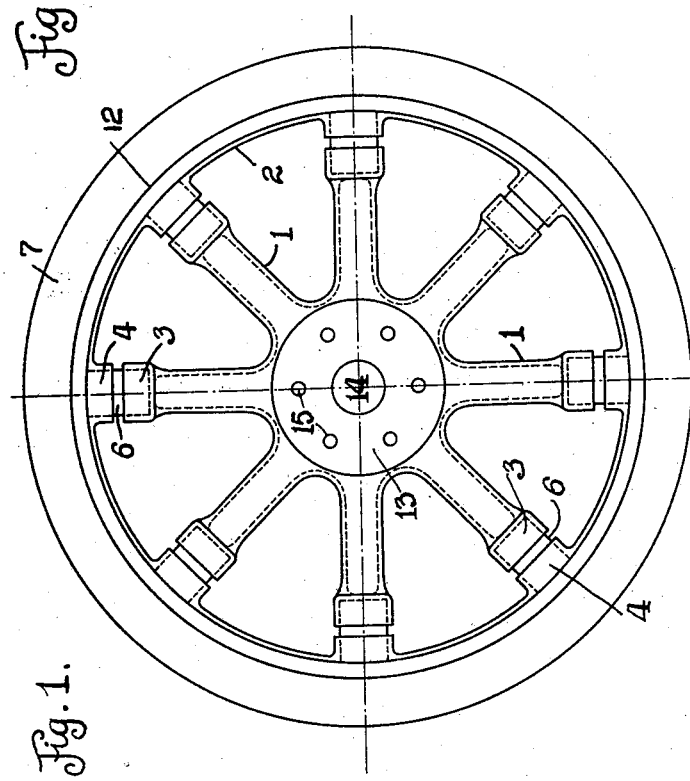
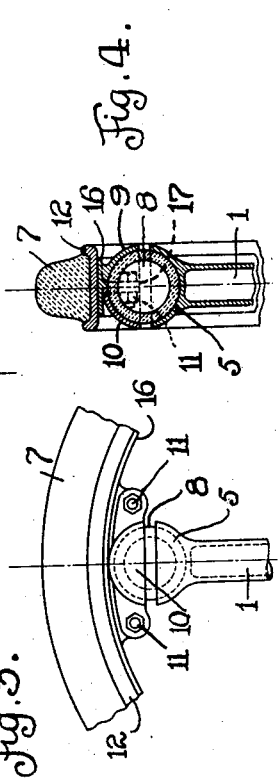
WITNESS:
Karl H. Butler
Chas W. Stauffzer
INVENTOR.
NELS L. OLSON
BY
ATTORNEYS.

UNITED STATES PATENT OFFICE.

NELS L. OLSON, OF HIGHLAND PARK, MICHIGAN.

RESILIENT WHEEL.

1,382,537.  Specification of Letters Patent.  Patented June 21, 1921.

Application filed March 24, 1919. Serial No. 284,656.

*To all whom it may concern:*

Be it known that I, NELS L. OLSON, a citizen of the United States of America, residing at Highland Park, in the county of Wayne and State of Michigan, have invented certain new and useful Improvements in Resilient Wheels, of which the following is a specification, reference being had therein to the accompanying drawings.

The gradual disappearance of wood suitable for the manufacture of vehicle wheels has created an increasing demand for metal wheels, especially in the motor truck industry. The main disadvantage of the wood wheel is that under the influence of weather wood contracts and expands with the result that after more or less extended service the spokes get loose, the felly warps to a certain extent, and the wheel finally has to be discarded. On account of this disadvantage metal wheels are coming more and more into favor due to their long life in service, and the fact that they are very little affected by the weather. Metal wheels made from several compound parts, either bolted or riveted together, do not stand the severe service demanded of them, especially when used with solid tires, the parts invariably working loose under the continual shock of the road, and for this reason, the cast wheel, made either of steel, malleable iron or semi-steel, is the only type which has met with any amount of success. These wheels are very much stronger than a wood wheel, and when made of hollow spokes the weight thereof can be brought down very close to that of a wood wheel.

There are, on the other hand, certain disadvantages inherent to the cast wheel; first, they are not as resilient as a wood wheel, being referred to as "hard riding," and under the continual vibrations to which they are subjected in service, the metal has a tendency to crystallize, particularly under severe cold with the result that the spokes crack. This last objection has been counteracted by doing away with the spokes, and making the wheel a full disk connecting the hub to the outer rim, but these wheels are so heavy and expensive that they can be used profitably only on the heaviest trucks.

The primary object of this invention is to produce a wheel which is light in weight, does not crystallize in use, and further, is more resilient than a wood wheel, this last quality being very desirable to reduce the road shocks transmitted to the wheel bearings and axles and thus considerably prolonging their life.

Another object of this invention is to provide a cast wheel body, which during its manufacture, is devoid of rim, thereby permitting the metal forming the hub and spokes of the wheel to shrink freely when setting in the mold without producing what are known as internal strains.

In other words, when a wheel is produced having spokes integral with the hub and rim, it is a fact well known in the foundry that the metal in the rim sets first on account of the large radiating surface offered by said rim. The fluid metal forming the spokes and hubs starts to set and shrink soon afterward, but the rim, being already solid and held firmly by the sand of the mold, is unable to follow the inward movement of the spokes with the result that the spokes crack at their junction to the rim. If no cracks appear, it has nevertheless developed in the structure of the spokes tremendous strains which after a certain amount of service develop into cracks with the result that the wheel has to be discarded.

If the structure of the metal in the different parts of the wheel is examined through a magnifying glass, it will be seen that the grain is not uniform, some part having a close, strong structure when in some other parts the crystals are coarse, forming a weak structure. These crystals are loosely held together and it is only a short time after the wheel is put in service that cracks begin to appear.

A further object of my invention is to provide a cast metal wheel with a rim that may be easily distended or re-shaped so that liners do not have to be used when a new tire has to be pressed on the wheel. The wheel rim is made slightly larger than the inside of the solid tire rim so that the tire has to be forced by hydraulic pressure over the wheel. This makes a good contact between the two surfaces and the tire is firmly held in position. However this operation has a tendency to slightly reduce the outside diameter of the wheel with the results that the second tire presses too easily; it is then necessary to insert canvas liners to increase the contact. But since I have a rim that is detachable relative to the wheel spokes, it is possible to distend the rim so that any subsequent tire will make as solid contact as the original one without having recourse to the expedient of the inserting liners.

A still further object of my invention is to provide a wheel which will eliminate a large amount of road shocks from the hub of the wheel, therefore making it possible to construct the hub and spokes of the wheel of a cheaper material than would be necessary if the whole wheel were made in one piece.

The above are a few of the objects which I attain by a wheel that will be hereinafter more fully considered and then claimed, and reference will now be had to the drawing, wherein—

Figure 1 is a side elevation of the wheel;

Fig. 2 is a cross sectional view of the same;

Fig. 3 is a side elevation of a portion of a wheel illustrating a slight modification of my invention, and Fig. 4 is a cross sectional view of the same.

In the drawing, the reference numeral 13 denotes a hollow hub having parallel side walls provided with openings 14 and 15, the former providing clearance for an axle, spindle or the equivalent thereof, and the latter providing clearance for fastening means so that a brake drum, hub cap or other member may be attached to the hub.

Integral with the hub 13 are hollow or tubular spokes 1 having the inner ends thereof communicating with the hollow hub and the outer ends thereof closed by cylindrical sockets 3 greater in diameter than the spokes 1.

Mounted in the sockets 3 are blocks of rubber 6 constituting resilient members that protrude from the sockets 3 and said members may be made of any suitable resilient or elastic material.

Circumferentially of the outer ends of the members 6 is an apertured rim 2 provided with tubular guide members 4, which are open, to receive the outer ends of the resilient members 6, said members being made of a length so that the outer ends thereof will slightly protrude from the periphery of the rim 2 to be compressed and yet maintain portions of said resilient members exposed between the sockets 3 and the guide members 4, said exposed portions constituting an elastic connection between the spokes and the rim.

Pressed or otherwise mounted on the rim 2 is a tire rim 12 provided with a suitable tire 7, said tire rim being of a greater width than the spoke rim and the tire 7 being of the hard rubber type, which represents a tire that may be advantageously used on truck wheels. When mounting the tire rim 12 on the spoke rim 2, the outer ends of the resilient member 7 are compressed, causing said resilient members to be firmly seated in the sockets 3. With the outer ends of the resilient members contacting with the inner wall of the tire rim 12 there is a frictional connection between the tire rim 12 and the rim 2 that diminishes the chances of the tire rim working loose, and this produces an elastic connection between the spokes and the rim, so that any road shocks received by the tire are partly absorbed by the resilient members thus making a vehicle ride easy. By forcing the pressed on tire rim 12 from the apertured rim 2 the resilient members may be removed and renewed.

The size and shape of the resilient members and their number are such that they coöperate in properly supporting a load, without crushing the resilient members, and at the same time resist the shearing action of the sockets 3 in transmitting the drive from the hub to the tire. Any side thrust is also resisted especially when rounding curves or corners at a high speed.

In Figs. 3 and 4 there is illustrated a slight modification of my invention, wherein the resilient or shock absorbing members are spherical and hollow and may be inflated to provide a desired degree of pressure, similar to a pneumatic tire. In this modification the resilient members are designated 8 and are seated in semi-spherical sockets 5 at the outer ends of wheel spokes. The resilient members 8 extend into semi-spherical sockets composed of parts 9 and 10, the former being integral with a rim 16 and the latter being in the form of a cap that is detachable relative to the rim 16 and the socket part 9, but is attached to a web portion 17 of the socket part 9, by bolts and nuts generally designated 11. This construction affords a demountable rim feature which is valuable when it is desired to change one of the resilient members, as it is only necessary to remove the bolts and nuts; and should the tire need renewal, it can be easily accomplished by removing all of the socket parts 10 and substituting a new tire and wheel rim without having to press the tire off of the tire rim. This feature is advantageous with trucks in use in farming communities, where no service station is at hand, and when a stoppage for tire replacement may mean the loss of much valuable time, as with my improvement it is only necessary to carry in stock a spare wheel rim with a tire thereon.

It is thought that the utility of my invention will be apparent without further description, and while in the drawing there is illustrated the preferred embodiments of my invention, it is to be understood that the structural elements are susceptible to such variations and modifications as fall within the scope of the appended claim.

What I claim is:—

A wheel comprising a body, resilient members in the periphery of said body and protruding therefrom, an apertured rim about said body and having the apertures thereof equally spaced, and cylindrical open end pockets integral with said apertured rim at the apertures thereof and through which said resilient members protrude so that said members may have the outer ends thereof compressed, and a pressed on tire rim about the apertured rim compressing the resilient members and permitting of said resilient members being mounted in the periphery of the wheel body without removing the apertured rim.

In testimony whereof I affix my signature in the presence of two witnesses.

NELS L. OLSON.

Witnesses:
 KARL H. BUTLER,
 G. E. McGRANN.